Patented Jan. 1, 1952

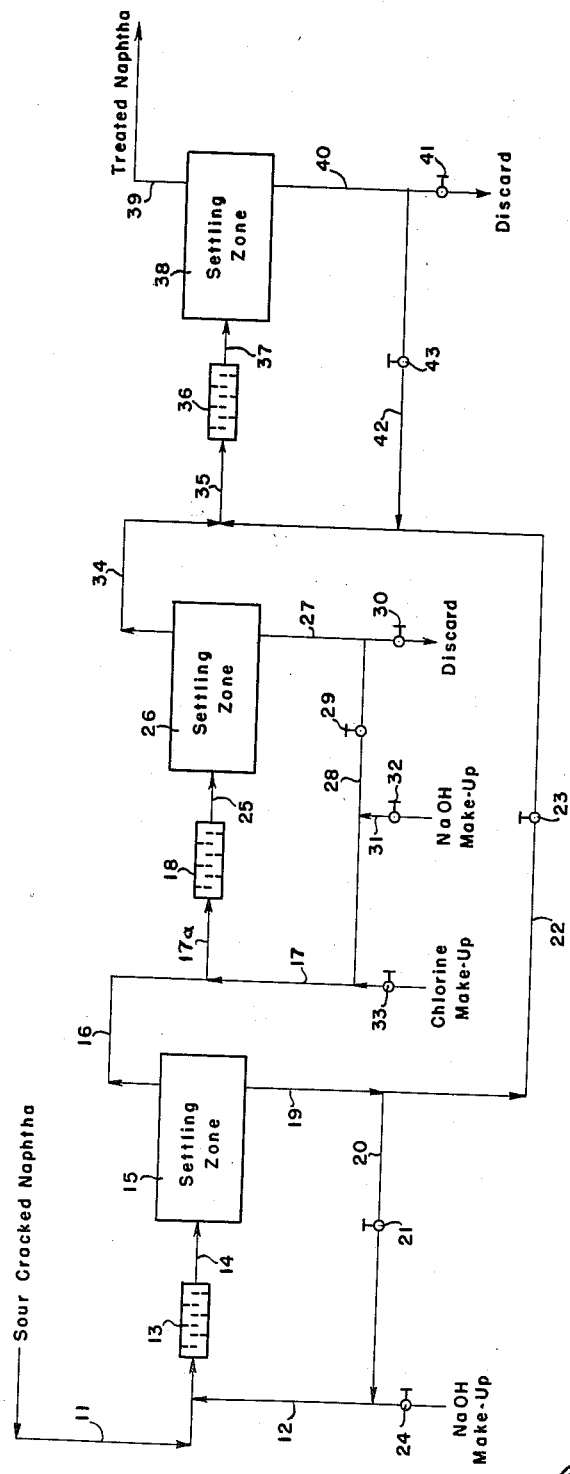

2,581,117

UNITED STATES PATENT OFFICE 2,581,117

TREATMENT OF CRACKED NAPHTHAS WITH A HYPOCHLORITE FOLLOWED BY AN ALKALI SULFIDE

Robert M. Love, Baytown, Tex., assignor, by mesne assignments, to Standard Oil Development Company, Elizabeth, N. J., a corporation of Delaware Application December 16, 1949, Serial No. 133,318

7 Claims. (Cl. 196—29)

The present invention is directed to a method of treating cracked hydrocarbons. In its more particular aspects the invention is concerned with a method of treating cracked naphthas which have been contacted with a hypochlorite solution.

Prior to the present invention it has been known to treat petroleum hydrocarbons with a hypochlorite solution such as sodium and calcium hypochlorite solutions. When efforts were made to extend the treatment with a hypochlorite solution to cracked naphthas the treated gasoline was often unstable in color and required further treatment to produce a marketable product. Kalichevsky and Stagner in their work, Chemical Refining of Petroleum, Reinhold Publishing Corporation, New York, 1942, page 212, have summarized the situation as follows:

"Cracked gasolines sweetened with hypochlorite are often unstable in color and must be redistilled or treated with clay to produce stability. This redistillation after the sweetening is often impractical, since the gasoline usually becomes sour again when redistilled. Because of these factors the hypochlorite sweetening has not become popular in the United States for cracked material, and to the knowledge of the writers it is nowhere in use for this purpose."

It is therefore the main object of the present invention to provide an improved process whereby cracked naphthas which have been treated with the hypochlorite solution may be treated to remove the objectionable features of the hypochlorite treating process.

A still further object of the present invention is to improve the stability of the hypochlorite treated cracked naphtha.

Another object of the present invention is to provide a treating process wherein hypochlorite treated oils may be enhanced in quality by treating them with a reagent employed in an early stage of the process.

The objects of the present invention may be achieved by contacting a hypochlorite treated oil with an aqueous solution comprising an alkali metal sulfide such as sodium sulfide or by contacting a hypochlorite treated oil with an aqueous solution of sodium hydroxide, which has previously been employed in removing acidic bodies from the sour cracked naphtha prior to hypochlorite treatment to impart increased stability to the hypochlorite treated oil.

The present invention therefore may be briefly described as involving the contacting of a hypochlorite treated cracked hydrocarbon with an aqueous solution comprising sodium sulfide at a temperature in the range from about 60° F. up to about 200° F. to cause removal of deleterious bodies from the hypochlorite treated oil. The invention also contemplates the pretreatment of a sour cracked naphtha containing acidic bodies such as hydrogen sulfide, phenols, organic acids and the like with an aqueous solution of an alkali metal hydroxide. Following this treatment the contacted naphtha is separated from the alkali metal hydroxide which now contains the enumerated acidic bodies. The separated naphtha is subjected to treatment with a hypochlorite solution under conditions to cause sweetening thereof, the hypochlorite solution separated therefrom and the sweetened naphtha is then contacted with the alkali metal hydroxide solution containing dissolved acidic bodies. This treatment enhances the stability of the hypochlorite treated oil.

The sodium sulfide solution employed in the practice of the present invention may be a solution of sodium sulfide formed by dissolving sodium monosulfide or a sodium polysulfide in water to form a solution containing from about 1% by weight of the sulfide up to saturation at the tempeature at which the treatment is conducted or the sodium sulfide solution may be formed by contacting a sour naphtha containing hydrogen sulfide with a solution of alkali metal hydroxide having a gravity in the range from 2° to 45° Baumé. The treating solution may be formed by dissolving an alkali metal sulfide in water or in an alkali metal hydroxide solution having a gravity up to 45° Baumé. A solution of alkali metal sulfide containing about 10% by weight of the sulfide gives good results and is preferred. When the sour cracked naphtha contains other acidic bodies besides H₂S and mercaptans, such as phenolic bodies or organic acids such as aliphatic or naphthenic acids, the sodium hydroxide solution will contain besides the sodium sulfide the corresponding salts of the phenolic compounds and the acids; for example, the sodium hydroxide solution may contain sodium sulfide, sodium phenolate, sodium naphthenate and other salts of the acidic bodies.

In practicing the present invention it will ordinarily be desirable to employ atmospheric temperatures ordinarily prevailing in the Gulf Coast area of the United States. These temperatures will range from about 60° to 100° F., and preferably within the range of 75° to 85° F. However, higher temperatures up to about 200° F. may be employed if desired. When higher temperatures are used, pressure may be imposed to maintain a liquid phase.

The amount of the solution containing sodium sulfide and other bodies employed in the practice of the present invention will ordinarily be about 10% by volume of the cracked naphtha being treated. It will be understood however that lesser amounts may be used, for example, 5% by volume and a greater amount may be used up to an equivalent amount of the cracked naphtha and sometimes an excess of the solution containing sodium sulfide and/or acidic bodies may be employed. An amount in the range between 5% and 20% by volume based on the cracked naphtha of the treating reagent will be preferred.

The present invention will be illustrated by reference to the drawing in which the single figure represents a flow diagram of a preferred mode.

Referring now to the drawing, numeral 11 designates a charge line connecting into a source of sour cracked naphtha not shown. This naphtha may be a thermally or catalytically cracked naphtha and ordinarily will have a boiling range from about 85° F. up to about 430° F. It is contemplated however that cracked petroleum fractions boiling up to about 550° F. may be treated in accordance with the present invention. For the purpose of illustration, it is considered that the naphtha introduced by line 11 has a final boiling point of 430° F. This naphtha flowing through line 11 has introduced thereinto a sodium hydroxide solution having a Baumé gravity of about 10° which is introduced by line 12 from a source which will be discussed further. The mixture of sour naphtha and sodium hydroxide in line 11 flows into an incorporating device 13 wherein the naphtha and sodium hydroxide solution are intimately admixed. It is understood that incorporating device 13 may be any type of mixing device available on the market and may include jet mixers, stirrers, contacting towers, centrifugal pumps and the like. The admixture is discharged from incorporator 13 by line 14 which introduces the contacted naphtha into a settling zone 15 which is of sufficient capacity to allow a residence time for separation by gravity between the contacted naphtha and the sodium hydroxide solution. The intimate admixture realized in incorporator 13 serves to remove hydrogen sulfide, mercaptans, phenolic compounds, organic acids, such as naphthenic acids, and the like, from the sour cracked naphtha and causes solution thereof into the sodium hydroxide solution.

The contacted naphtha withdrawn from settling zone 15 by line 16, in admixture with a hypochlorite solution, introduced by line 17, is directed by line 17a into a second incorporating device 18 wherein the contacted naphtha is intimately admixed with the hypochlorite solution the source of which will be described further.

The sodium hydroxide solution containing dissolved acidic bodies separated in settling zone 15 is discharged therefrom by line 19 and may be divided into two parts; one part may be recycled to line 12 by line 20 controlled by valve 21 while the second part may be flowed through line 22, controlled by valve 23 to be used as will be discussed further. Line 12 is provided with a valve 24 to allow introduction of make-up sodium hydroxide solution to replace that withdrawn and circulated by line 22.

The admixture of contacted naphtha and hypochlorite in incorporator 18 allows the naphtha to be sweetened and the sweetened naphtha is withdrawn from incorporator 18 by line 25 and discharged into a second settling zone 26 which is of similar size and capacity to settling zone 15 and allows separation to be made by gravity between the treated naphtha and the hypochlorite solution.

The hypochlorite solution separated by gravity from the treated naphtha in settling zone 26 is withdrawn therefrom by line 27 and may be recycled to line 17 by line 28, controlled by valve 29, or a portion of it may be discharged by opening valve 30 in line 27. Ordinarily, however, the hypochlorite solution in large part will be recycled by line 28 to line 17 and, therefore, it may be necessary to maintain the strength of the hypochlorite solution by adding sodium hydroxide solution thereto through line 31, controlled by valve 32, and also adding chlorine by opening valve 33 in line 17. Of course, if valve 29 is closed and the hypochlorite solution is discharged by opening valve 30 it will be necessary to add continuously fresh hypochlorite solution and this may be introduced by either line 17 or line 31.

The treated naphtha from settling zone 26 is discharged therefrom by line 34 and is admixed with the sodium hydroxide solution withdrawn from settling zone 15 by lines 19 and 22. This solution may contain dissolved acidic bodies as the reaction product thereof, such as sodium sulfide, the salts of phenolic compounds and organic acids. The admixture flows by way of line 35 into a third incorporator 36 wherein the treated naphtha is intimately contacted with the solution withdrawn from zone 15. This treatment in incorporator 36 serves to stabilize the hypochlorite treated oil and results in the enhancement of the breakdown time or induction period of the treated naphtha. The admixture of solution from zone 15 and treated naphtha from incorporator 36 is discharged by line 37 into a third settling zone 38 which is similar in size and capacity to settling zones 15 and 26. In settling zone 38 a separation is made between the treated naphtha and the solution introduced from zone 15, the final treated naphtha being withdrawn by line 39 to be used as a motor fuel while the separated solution is withdrawn by line 40 and may me discarded in toto by opening valve 41 or may be recycled in part by line 42, controlled by valve 43, to line 22 for admixture with the naphtha in line 34. Since it has been observed that hypochlorite treated oils deteriorate on standing, it is desirable that the treated oils be washed in accordance with the present invention without undue delay. Thus, the settling steps in zone 26 requires between 30 to 60 minutes and, in practice, the treated oil would be washed with the sulfide solution or spent caustic after that period of time. Several hours may elapse, however, before the hypochlorite treated oils are treated with the sodium sulfide or spent caustic solutions without destroying the effectiveness thereof.

It will be seen from the foregoing disclosure taken with the drawing that an efficient and simple process has been described which allows the treatment of sour cracked naphtha with hypochlorite which heretofore has not been possible.

The hypochlorite solution employed in the practice of the present invention is preferably sodium hypochlorite but may be an alkaline earth hypochlorite such as calcium hypochlorite. It is contemplated that the other alkali metal hypochlorites may be employed such as lithium.

and potassium hypochlorites or that the hypochlorite solution may be a solution of an alkaline earth hypochlorite such as magnesium, calcium, and strontium hypochlorite.

The hypochlorite solution will ordinarily have an available chlorine content in the range from about 2 grams per liter to about 150 grams per liter; concentration of about 10 grams per liter gives good results.

The hypochlorite solution when it is sodium hypochlorite solution will preferably have an average sodium hydroxide content ranging from about 5 to about 750 grams of sodium hydroxide per liter. Ordinarily the hypochlorite solution employed will contain free sodium hydroxide in the range from about 50 to 100 grams per liter. It may be stated however that the present invention has most applicability to treatment of naphthas which have been contacted with hypochlorite solutions having a low level of causticity since naphthas treated with sodium hypochlorite having a small amount of free sodium hydroxide are generally more unstable than those having a high level of free sodium hydroxide.

In order to illustrate the invention further, runs were made on a thermally cracked naphtha, a 400° F. end point cracked naphtha which is a mixture of thermally and catalytically cracked naphthas, and a 375° F. end point cracked naphtha which was a similar mixture of thermally and catalytically cracked naphtha. These three naphthas were treated with a hypochlorite solution having an average chlorine content of 10 grams per liter and a free sodium hydroxide content of 150 grams per liter. The several naphthas treated with the hypochlorite solutions were subjected, after separation of hypochlorite solution, to treatment with water, to treatment with 10° Baumé caustic solution which previously had been spent by pretreating the sour cracked naphtha and to treatment with a 12° Baumé sodium hydroxide solution. In some of the runs the hypochlorite treated naphtha was treated with a 10 weight per cent solution of sodium sulfide in water. A run was also made in which the thermally cracked naphtha was sweetened with doctor solution.

After the naphtha had been treated with hypochlorite and followed by treatment with the several reagents, the breakdown time or induction period was determined by the ASTM method designated D525–46. The color of the naphtha after 24 hours and 11 days storage was also determined. These results are given in the following table:

The foregoing data show that the induction period, which is an indication of the tendency of motor gasoline to form gum on storage, of a hypochlorite treated cracked naphtha is much longer and, therefore, has less tendency to form gum after treatment with spent caustic than after washing with water or fresh caustic. The treatment of the hypochlorite treated oil with sodium sulfide solution results in a longer induction period than that obtained with water or fresh caustic. The data also show that sweetening of cracked naphthas with hypochlorite followed by treatment with spent caustic results in a naphtha of higher induction period than that obtained by doctor sweetening the cracked naphtha.

It is postulated that treatment with spent caustic, obtained by contacting the sour naphtha with sodium hydroxide prior to the hypochlorite sweetening, resulted in greater induction periods, when used in treating the hypochlorite treated oil, because of the presence in the spent caustic of salts of phenolates and other acidic bodies besides sodium sulfide.

In practicing the present invention it is desirable to maintain the alkalinity of the hypochlorite solution employed in the process at a high level in order to minimize consumption of hypochlorite and corrosion of equipment, since in employing hypochlorite solutions having an average sodium hydroxide content below about 90 grams per liter ferrous metal equipment is rapidly attacked by the hypochlorite. Therefore, it is contemplated that sufficient sodium hydroxide will be added to the process as described to maintain the causticity at above 90 grams per liter. It is further contemplated that sufficient chlorine will be added as make-up to replace that consumed or discarded. When employing high caustic content hypochlorite solution it is desirable to add sodium hydroxide and chlorine as make-up and to withdraw a portion of the hypochlorite solution to prevent build up of sodium chloride in the system.

The nature and objects of the present invention having been completely described and illustrated, what I wish to claim as new and useful and to secure by Letters Patent is:

1. A method of treating a cracked hydrocarbon which has been contacted with a hypochlorite solution which comprises contacting said hydrocarbon with an aqueous solution comprising an alkali metal sulfide.

2. A method in accordance with claim 1 in which the alkali metal is sodium.

| Charge Stock | Hypochlorite Solution Used— | | After-Wash (10 Vol. Per Cent) | Induction Period, Mins.[3] | Saybolt Color | |
|---|---|---|---|---|---|---|
| | Available CL$_2$, Grams Per Liter | Free NaOH, Grams Per Liter | | | After 24 Hrs. | After 11 Days |
| Thermally Cracked Naphtha | ([1]) | ([1]) | None | 135 | −2 | |
| Do | 10 | 100 | Water | 20 | Less Than −16 | Less Than −16 |
| Do | 10 | 100 | Spent Caustic | 390 | −4 | −4 |
| Do | 10 | 100 | Fresh 12° Be. NaOH | 75 | Less Than −16 | |
| Do | 10 | 50 | Water | 40 | −16 | |
| Do | 10 | 50 | Spent Caustic | 360 | −7 | |
| Do | 10 | 100 | 10 Wt. Per Cent Aqueous Na$_2$S Sol'n | 195 | Less Than −16 | |
| Do | ([2]) | ([2]) | None | 320 | −2 | |
| 400° F. End Point Cracked Naphtha | 10 | 100 | Water | 60 | [4]12 | |
| Do | 10 | 100 | Fresh 12° Be. NaOH | 30 | [4]17¼ | |
| Do | 10 | 100 | Spent Caustic | 135 | [4]17½ | |
| Do | 10 | 100 | Na$_2$S Sol'n | 120 | [4]17¼ | |
| 375° F. End Point Cracked Naphtha | 10 | 100 | Water | 135 | +14 | |
| Do | 10 | 100 | Spent Caustic | 435 | +14 | |

[1] Untreated.
[2] Dr. Sweetened.
[3] ASTM D525–46. Sometimes called "Breakdown Time."
[4] Tag-Roginson Color.

NOTE: All samples inhibited with 15 lbs. of N,N'-Di-sec-butyl-p-phenylenediamine per 1,000 bbls. before testing.

3. A method of treating a sour cracked naphtha containing hydrogen sulfide which comprises contacting said naphtha with an aqueous solution of an alkali metal hydroxide to remove said hydrogen sulfide and to form alkali metal sulfide in said solution, separating the contacted naphtha from the alkali metal hydroxide solution, treating the contacted naphtha with an aqueous hypochlorite solution under conditions to sweeten same, separating hpyochlorite solution from the treated naphtha, and contacting the treated naphtha with the separated alkali metal hydroxide solution containing alkali metal sulfide.

4. A method in accordance with claim 3 in which the alkali metal is sodium.

5. A method of treating a cracked naphtha which has been contacted with a solution of sodium hypochlorite which comprises contacting said cracked naphtha with an aqueous solution of sodium sulfide.

6. A method of increasing the stability of a cracked naphtha which comprises contacting a sour cracked naphtha containing acidic bodies including hydrogen sulfide with an aqueous solution of sodium hydroxide having a Baumé gravity in the range from 2° to 45° to cause removal of acidic bodies and hydrogen sulfide therefrom and to form sodium sulfide in said solution, separating sodium hydroxide solution containing dissolved acidic bodies and sodium sulfide from the contacted naphtha, treating the contacted naphtha with a solution of sodium hypochlorite under conditions to sweeten same, separating the treated naphtha from the hypochlorite solution, and contacting the treated naphtha with the sodium hydroxide solution containing dissolved acidic bodies.

7. A method in accordance with claim 6 in which the sour cracked naphtha has an end point of 430° F.

ROBERT M. LOVE.

REFERENCES CITED

The following references are of record in the file of this patent:

UNITED STATES PATENTS

| Number | Name | Date |
|---|---|---|
| 1,435,824 | Dunstan | Nov. 14, 1922 |
| 1,552,830 | Dunstan | Sept. 8, 1925 |
| 2,488,855 | Denton | Nov. 22, 1949 |